United States Patent Office 3,573,892
Patented Apr. 6, 1971

3,573,892
PROPAGATING COMPOST OF PEAT
AND FERTILIZER
Peter Samuel Atkins, near Ipswich, Suffolk, and Derek
Charles Attenburrow, Ipswich, Suffolk, England, assignors to Fisons Limited, Felixstowe, Suffolk, England
No Drawing. Continuation-in-part of application Ser. No.
563,993, July 11, 1966. This application Apr. 23, 1968,
Ser. No. 723,570
Claims priority, application Great Britain, July 23, 1965,
31,453/65
Int. Cl. C05f 11/02
U.S. Cl. 71—24        5 Claims

ABSTRACT OF THE DISCLOSURE

A superior propagating compost is provided which is substantially free from sand or soil, which contains a total of at least 60% by weight of water based on the dry weight of the components, and which compost comprises a milled peat in admixture with a fertilizer base, optionally in admixture with a bulking or carrier material for the fertilizer base, the mixture having a pH value in the range 5.5 to 7.0; the milled peat being characterized in that it is a free flowing particulate peat all of whose particles pass through a ⅜ inch sieve aperture, less than 7% passing through a No. 60 BSS. sieve and in that it contains not less than 30% by volume of particles having a density greater than that of a petroleum ether having a boiling point in the range 80–100° C. at 760 mm. of mercury.

---

The present invention relates to propagating composts and is a continuation-in-part of our copending application Ser. No. 563,993 filed July 11, 1966, and now abandoned.

Over thirty years ago, it was common practice for growers and gardeners to use a multitude of compost mixtures according to their own experiences and often these mixtures were used with success. However, due to the wide divergence in practices and the materials from which the composts were being made, it soon became apparent that there was a distinct need for more standardization, especially for commercial production of plants. The research carried out by the John Innes Horticultural Institute was the first step forward in this direction and the John Innes composts which were introduced in the late 1930's gave good and reliable results where composts were made strictly to the specification laid down by Lawrence and Newell. Their limitation, however, arises from their dependence on loam as a major ingredient and this loam must be of the right type, physical structure and chemical composition to give good results. Unfortunately, loam is variable material and the sources of the best types of loam are decreasing. Consequently inferior loams are being used and the material now sold as John Innes composts is of varying quality.

The next step forward was the development of mixtures of peat and sand with suitable nutrient additions which were used in place of composts in which loam was essential. The University of California was one of the first centres at which composts of this former type were developed and inevitably, as the outcome of their work, many other similar composts have been tried with varying results.

Most surprisingly we have now found that substantial differences in plant growth are obtained in different types of peat and that one particular peat grade is superior and does not require the presence of sand in composts prepared therefrom.

Accordingly, the present invention provides a propagating compost which is substantially free from sand or soil, which contains a total of at least 60% by weight of water based on the dry weight of the components, and which compost comprises a milled peat in admixture with a fertilizer base, optionally in admixture with a bulking or carrier material for the fertilizer base, the mixture having a pH value in the range 5.5 to 7.0; the milled peat being characterised in that it is a free flowing particulate peat all of whose particles pass through a ⅜ inch sieve aperture, less than 7% passing through a No. 60 BSS. sieve and in that it contains not less than 30% by volume of particles having a density greater than that of a petroleum ether having a boiling point in the range 80–100° C. at 760 mm. of mercury.

The peats for present use may be of any type, for example dark or sedge peats, though they are preferably white peats, which are known in the United Kingdom as sphagnum moss peats. Their suitability for present use may be assessed visually, since they are usually dark brown free flowing granular materials. Whilst the size of all particles should ideally not exceed ⅜ inch on the longest axis, conditions of milling will affect the particle size obtained from any one milling operation and it is not in practice feasible to prevent long thin fibres which may not have been broken up during milling from passing through a ⅜ inch diameter hole, even though they may be ½ an inch or more long. However, whilst a certain proportion of long fine fibres may be tolerated in the milled peat, such fibres affect the free flowing nature of the peat. It is not possible to give a precise limit as to the content of such long fine fibres, since other factors may affect the flow properties of the peat. However, in a typical sphagnum moss peat dug from the Swinefleet bog in England, the fine long fibre content should not exceed about 5% by volume.

The presence of the hard denser particles in the powdered peat aids the drainage of water through the compost. However, excessive amounts of hard particles may lead to impaired root growth in seedlings bedded in the compost. We therefore prefer to use peats which contain from 30 to 80%, especially 30 to 70%, by volume of the denser particles. As indicated above, the density of the particles is compared with that of a petroleum ether having a boiling point in the range 80–100° C. at 760 mm. of mercury. The comparison may conveniently be carried out by means of a sink or swim technique in which the dried milled peat is stirred into a beaker of the petroleum ether and the proportion which sinks then determined. Typical results for several 10 gram samples of peat are set out in Table 1.

TABLE 1

| Sample No: | Volume sinking, ml. | Volume floating, ml. | Percent denser material | Comment as to suitability |
|---|---|---|---|---|
| 1 | 40 | 95 | 29.6 | Just rejected. |
| 2 | 45 | 115 | 28.1 | Do. |
| 3 | 40 | 115 | 25.8 | Rejected. |
| 4 | 40 | 95 | 29.6 | Just rejected. |
| 5 | 50 | 65 | 43.5 | Accepted. |
| 6 | 50 | 70 | 42.5 | Do. |
| 7 | 55 | 75 | 43.3 | Do. |
| 8 | 50 | 90 | 35.7 | Do. |
| 9 | 45 | 95 | 32.2 | Just accepted. |

As indicated above, free drainage through the compost is an object of the present invention. It is therefore desirable that there should be comparatively little very fine material in the milled peat.

The grain size of the milled peat is preferably such as to give a sieve analysis by weight as follows: 100% through ⅜", 83–95% through ¼", 80–86% through 3/16", 65–75% through No. 5 BSS sieve, 45–55% through a No. 8 BSS sieve, 35–45% through a No. 12 BSS sieve, 22–28% through a No. 18 BSS sieve, 13–19% through a No. 30 BSS sieve and not more than 7%, preferably less than about 6%, through a No. 60 BSS sieve.

The fertilizer base added to the peat will usually contain the nutrient elements nitrogen, potassium and phosphorous together with trace elements such as iron, copper, molybdenum, magnesium and the like. Typical nutrients will be potassium salts such as potassium nitrate, and potassium sulphate, phosphates such as superphosphates, e.g. triple superposphate, monoammonium phosphate, tripotassium phosphate and the like, ammonium salts such as ammonium nitrate and ammonium sulphate and organic nitrogen-containing materials such as decomposable low molecular weight ureaformaldehyde resins, hoof and horn, dried blood and the like.

If desired, limestone may be added to the peat as a part of the fertilizer base. If the limestone is added separately, it may be convenient to incorporate an inert bulking or carrier material, such as sand, in the fertilizer base in order to render mixing of the base with the peat more simple. The amount of bulking or carrier material used is small compared to the peat and is usually less than 5% by weight thereof. This is in contrast to the sand content of presently used peat composts which may contain 25% or more by volume of sand, which is equivalent to some 800% by weight. The term substantially soil and sand free is therefore used herein and in the claims to denote both a compost which contains no added sand or soil and a compost to which either of these materials have been added in minor amount as the bulking or carrier material for the fertilizer base. Furthermore, an inert material may be added to the fertilizer base so as to alter the visual characteristics of the compost, thus enabling composts having different nutrient levels to be distinguished by different visual characteristics.

The amount of fertilizer base incorporated is preferably such as to provide between 10 and 10,000 parts of nitrogen as N per million parts by weight of compost on a dry basis, between 50 and 10,000 parts of potassium as $K_2O$ per million parts by weight of compost on a dry basis and between 30 and 10,000 parts of phosphorus as $P_2O_5$ per million parts by weight compost on a dry basis.

If a seedling compost is being prepared the fertilizer base is suitably added in such an amount as to provide between 10 and 1,000 parts of nitrogen as N per million parts by weight of compost on a dry basis; between 50 and 2,000 parts of potassium as $K_2O$ per million parts by weight of compost on a dry basis; and between 30 and 2,000 parts of phosphorus as $P_2O_5$ per million parts by weight of compost on a dry basis. For a potting compost the fertilizer base is suitably added so as to provide 1,000–10,000 p.p.m. of N, 2,000–10,000 p.p.m. of $K_2O$ and 2,000–10,000 p.p.m. of $P_2O_5$; all measured on a dry basis.

The pH of the mixture of milled peat and fertilizer base is adjusted to the required level by for example the addition of limestone, preferably by the addition of a magnesium containing limestone, for example a limestone containing 25% $MgCO_3$; or by the addition of a magnesium contaiinng limestone in admixture with a non-magnesium limestone, such as chalk. The limestone is conveniently added in an amount of from 80 to 400 grams per bushel of peat. (A bushel of peat of the type defined above contains between about 6 and 7 pounds of peat on a dry basis.)

The compost of the invention may be prepared merely by mixing together the dry ingredients using conventional techniques, though it is preferred to add the requisite amount of water to the compost before the fertilizer base is added.

The following examples are given to illustrate the present invention.

EXAMPLE 1

A white peat known in Great Britain as a sphagnum moss peat was milled and graded at a moisture content of 30% to 35% by weight to give a sieve analysis as follows: 100% through 3/8", 91.0% through a 1/4", 83% through 3/16", 67% through No. 5; 50% through No. 8; 39.5% through No. 12; 27.5% through No. 18; 17.0% through No. 30 and 6.5% through No. 60. (All sieves according to BSS.) Some 35% of the volume of the milled peat particles sank when a sample was stirred into a beaker of 80/100 petroleum ether.

Magnesium limestone (25% $MgCO_3$) at the rate of 342 grams per bushel was mixed with the milled peat and the water level was raised to 65% by weight based on the dry weight of the components. The pH of the mixture was 6.1.

The seedling fertilizer base formulation was potassium nitrate 12.0%, potassium sulphate 13.0%, triple superphosphate 32.7%, ferrous sulphate 12.4%, copper sulphate 3.6%, sodium molybdate 0.2% and sand 26.1% and this was mixed into the limestone peat mixture at the rate of 3.2 ounces per bushel of peat.

A seedling compost was obtained which was light in weight and exhibited consistently high germination for a wide variety of seeds.

EXAMPLE 2

A compost was formulated as in Example 1 but this time a potting fertilizer base was used to replace the seedling fertilizer base and this was used at 372 grams per bushel. Moreover, the peat contained some 48% by volume of particles which sank upon being stirred into 80/100 petroleum ether. The potting fertilizer base consisted of potassium nitrate 10%, sulphate of potash 6.0%, triple superphosphate 16.0%, ferrous sulphate 3.0%, copper sulphate 1.0%, sodium molybdate 0.05%, hoof and horn grade 1, 42.0%, sand 22.0%.

EXAMPLE 3

A seedling compost was made by mixing a fertilizer base having the composition:

| | Percent |
|---|---|
| Potassium nitrate | 3.02 |
| Triple superphosphate | 2.74 |
| Magnesium limestone powder | 58.90 |
| Ground chalk | 35.34 | at a rate of 12.73 ounces per bushel of peat with a sphagnum peat as described in Example 1, except that the peat contained some 54% by volume of denser particles. Water was then added to the mixture until it had a water content of 60% by weight based on the weight of the dry components.

EXAMPLE 4

A potting compost was made by mixing a fertilizer base having the following composition.

| | Percent |
|---|---|
| Potassium nitrate | 5.9 |
| Triple superphosphate | 9.6 |
| Potassium sulphate | 3.5 |
| Ferrous sulphate | 1.8 |
| Copper sulphate | 0.6 |
| Sodium molybdate | 0.03 |
| Ammonia sulphate | 3.9 |
| Ureaformaldehyde fertilizer (38% N) | 6.4 |
| Magnesium limestone powder | 42.67 |
| Ground chalk | 25.6 | at a rate of 17.588 ounces per bushel of peat with a peat as described in Example 1, except that the peat contained some 62% by volume of denser particles. Water was then added to the mixture until it had a water content of 60% by weight based on the weight of the dry components.

The compost of the present invention has several advantages over composts based on loams or peat/sand mixtures. Firstly a peat compost is provided which does not include soil and only a very small proportion, if any, of sand. This reduces the number of variables possible in formulating the compost and uniformity of the product, and consequently the plant growth therein, is more assured.

Secondly, because of the absence of considerable quantities of sand and soil, the compost is light in weight. This eases handling problems on the nursery where women are often employed for plant raising operations.

Thirdly, with many composts it is necessary to avoid the danger of over-watering and management of plant growth is therefore subject to this added hazard. With the peat compost of the invention the open and free draining characteristics thereof make over-watering far more difficult.

The following experiments indicate the superior qualities of the compost of the present invention over conventional composts.

In this trial a compost of the present invention made according to Example 1 was tested as a Seedling compost against three other composts viz "No-Soil," a mixture of a dark peat of the type known in Great Britian as a sedge peat and 25% by volume sand; a compost made up of a selected dark peat known in Great Britain as a sedge peat and which contained some 15% of particles which passed through a 60 BSS. sieve; and one made up from a white peat known as Hatfield sphagnum peat which contained more than 7% of very fine particles and less than 30% of whose particles sank when stirred into $80/100$ petroleum ether. All composts received equal amounts of fertilizer so that any difference could be considered due to the affect of the peat. Bedding plants, namely chrysanthemums, dahlias and cucumbers, were used in the trial and, to rule out any special technique in handling the compost, seven operators with little or no experience of working with peat took part in the trial. After sowing all composts received identical routine cultural treatments as regards watering etc.

The results showed that the compost of the invention gave better germination.

As a further test, the following plants: stocks, allysum, lobelia, antirrhinums and petunias, were grown in three composts, viz the compost of the present invention, "No-Soil" and John Innes compost. All treatments were routine and subjected to normal commercial growing conditions, i.e. sowing, pricking out and growing on. The seed was sown in the recommended seedling strength for all three composts and pricked out into the recommended potting strength composts. The plants were grown on until final planting out stage. The potting compost of the present invention produced much better and more vigorous growth than the other composts.

We claim:
1. A propagating compost containing less than 5% by weight of sand and soil, which contains at least 60% by weight of water based on the dry weight of the components, and which compost comprises a milled peat in admixture with a fertilizer base, the mixture having a pH value in the range 5.5 to 7.0; the milled peat being characterized in that it is a free-flowing particulate peat all of whose particles pass through a 3/8" sieve aperture, 83–95% through a 1/4" sieve, 80–86% through a 3/16" sieve, 65–75% through a No. 5 BSS. sieve, 45–55% through a No. 8 BSS. sieve, 35–45% through a No. 12 BSS. sieve, 22–28% through a No. 18 BSS. sieve, 13–19% through a No. 30 BSS. sieve and not more than 7% passing through a No. 60 BSS. sieve and in that it contains not less than 30% by volume of particles having a density greater than that of a petroleum ether having a boiling point in the range 80–100° C. at 760 mm. of mercury.

2. A compost as claimed in claim 1 in which the pH of the compost is adjusted to the desired level by the addition of a limestone.

3. A compost as claimed in claim 2 in which said limestone is a magnesium containing limestone.

4. A compost as claimed in claim 1 in which the fertilizer base contains one or more nutrients selected from potassium nitrate, potassium sulphate, single superphosphate, triple superphosphate, monoammonium phosphate, tripotassium phosphate, ammonium nitrate, ammonium sulphate, low molecular weight ureaformaldehyde resins, hoof and horn meal and dried blood.

5. A compost as in claim 1 in which a bulking or carrier material for the fertilizer base is used in admixture with the compost material.

References Cited
UNITED STATES PATENTS

| | | | |
|---|---|---|---|
| 1,610,109 | 12/1926 | Pease et al. | 71—24 |
| 1,988,307 | 1/1935 | Fay | 71—24X |
| 1,858,230 | 5/1932 | Walton et al | 71—24 |
| 3,307,934 | 3/1967 | Palmer et al. | 71—24 |

OTHER REFERENCES

Nehrling—"Propagating House Plants," 1962—pp. 25 and 26—Published by Hearthside Press, Inc., New York.

Everett—New Illustrated Encyclopedia of Gardening, vol. 8, 1960—p. 1398—Published by Greystone Press, New York—copy in Group 330 (SB45N4).

REUBEN FRIEDMAN, Primary Examiner

B. H. LEVENSON, Assistant Examiner

U.S. Cl. X.R.

71—64